United States Patent
Bras et al.

(10) Patent No.: US 7,577,138 B2
(45) Date of Patent: Aug. 18, 2009

(54) DEVICE OF DYNAMICALLY ASSIGNING VARIABLE LENGTH PREFIXES FOR IP NETWORK EQUIPMENTS

(75) Inventors: Gwenael Bras, Paris (FR); Laurent Clevy, Chartres (FR)

(73) Assignee: Alcatel, Paris (FR)

( * ) Notice: Subject to any disclaimer, the term of this patent is extended or adjusted under 35 U.S.C. 154(b) by 613 days.

(21) Appl. No.: 11/305,042

(22) Filed: Dec. 19, 2005

(65) Prior Publication Data

US 2006/0159086 A1     Jul. 20, 2006

(30) Foreign Application Priority Data

Dec. 20, 2004    (FR) ................................ 04 53092

(51) Int. Cl.
*H04L 12/56* (2006.01)

(52) U.S. Cl. .................... 370/389; 370/393; 370/395.3
(58) Field of Classification Search ................ 370/389, 370/392, 393, 395.3, 395.54, 470–476
See application file for complete search history.

(56) References Cited

U.S. PATENT DOCUMENTS

2003/0182445 A1    9/2003 Smith

OTHER PUBLICATIONS

O. Troan et al, "IPv6 Prefix Options for Dynamic Host Configuration Protocol (DHCP) version 6", IETF Standard, Internet Engineering Task Force, IETF, CH, Dec. 2003 XP015009415.
Byung-Yeob Kim et al, Hierarchical Prefix Delegation Protocol for Internet Protocol Version 6 (IPv6), IETF Standard-Working-Draft, Internet Engineering Task Force, IETF, CH, No. 1, Feb. 15, 2004, XP015011290.
T. J. Kniveton et al, "Mobile Network Prefix Delegation", IETF Standard-Working-Draft, Internet Engineering Task Force, IETF, CH, Oct. 15, 2004.

*Primary Examiner*—Chirag G. Shah
*Assistant Examiner*—Daniel Mitchell
(74) *Attorney, Agent, or Firm*—Harness, Dickey & Pierce (57) ABSTRACT

Example embodiments disclose a prefix assignment device for use in network equipments of an Internet Protocol communication network, the device including a processing module. The processing module of the prefix assignment device may determine a node Nj associated with an unassigned prefix Pj of length L(Pj) equal to L(Rk)−m. The processing module may also assign prefix Pj to the network equipment Rk if m is equal to 0 and/or perform successive m loops if m is greater than 0. The module may select one of the two prefixes with lengths equal to L(Rk) for assignment to the network equipment Rk.

32 Claims, 3 Drawing Sheets

DEVICE OF DYNAMICALLY ASSIGNING VARIABLE LENGTH PREFIXES FOR IP NETWORK EQUIPMENTS

CROSS-REFERENCE TO RELATED APPLICATIONS

This application is based on French Patent Application No. 0453092 filed Dec. 20, 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to Internet Protocol (IP) communication networks, and more particularly to devices for assigning prefixes of network equipments of IP networks, for example routers.

In the present context, the expression "network equipment" means any equipment of an IP network that has to be associated with an IP address in order to be contacted.

2. Description of the Prior Art

The person skilled in the art knows that network equipments such as IP routers have communication interfaces that are connected to links and can be contacted using different IP addresses.

In an IP version N° 6 (IPv6) network, each IPv6 address consists of a network identifier (generally defined by 64 bits) and an interface identifier (generally defined by 64 bits). This kind of address takes the following form, for example: 2001 :1d80 :ab58 :8451 :8454 :1100 :aef0 :8845, in which the leftmost 64 bits (2001 :1d80 :ab58 :8451) constitute the network identifier and the rightmost 64 bits (8454 :1100 : aef0 :8845) constitute the interface identifier.

The interface identifiers are used to differentiate interfaces on the same local link. Each interface identifier of a router is usually determined by the router itself when it is started up, by means of its MAC address.

The network identifiers are used to designate (address) a link on the network. They consist of a network prefix (denoted "/n"), defined by the leftmost more significant 48 bits, for example (in this case denoted, in shortened form, "/48" (n=48)) and defining a family of addresses. The network prefix /n is supplied by the network (generally by a network prefix server) and usually represents $2^{(64-n)}$ different network identifiers. It therefore serves as a "reserve" for generating other network identifiers.

For example, a global network prefix /48, such as 2001 : 458 :1125 ::/48, can be used to define the network identifiers 2001 :458 :1125 :0000 ::/51 through 2001 :458 :1125 : E000 :: / 51, which constitute eight ($2^3$) prefixes of type /51 that can in turn serve as a reserve for constituting other prefixes of type / 54, and so on. In this example, "::" represents a series of successive zeros (0); for example, 2001 :458 :1125 : 0000 ::/ 51 is equivalent to 2001 :458 :1125 :0000 :0000 : 0000 : 0000 :0000.

In stateless address auto-configuration IPv6 networks, which are defined by Internet Engineering Task Force (IETF) standards RFC 2461 and RFC 2462, each supplies a network identifier to each terminal connected to its interfaces using a router advertisement/router solicitation (RA/RS) mechanism.

To this end, the router must first obtain a network prefix to use as a resource for generating network identifiers for the terminals that are connected to its interfaces. To obtain a prefix, a router may use what the person skilled in the art knows as hierarchical prefix delegation (HPD), as described in particular in the IETF document "draft-bykim-ipv6-hpd-01.txt", ETRI, 15 Feb. 2004, available at the Internet address http://ieffreport.isoc.org/all-ids/draft-bykim-ipv6-hpd-01.txt.

That mechanism consists first of all in assigning a global network prefix (/n), generally of /48 type, to a single router, called the "root router", so that it has an addressing space represented by a global network prefix that it can "chop" (or fragment or divide) into (sub-)prefixes of greater length (for example /51) and make available to other "downstream" routers connected via links to its own interfaces. Each downstream router can then in turn chop into (sub-)prefixes of even greater length (for example /54) the (sub-)prefix assigned to it by the ("upstream") root router, in order to make them available to other downstream routers connected via links to its own interfaces, and so on, thereby progressively constructing a hierarchical delegation tree.

In current networks, the policy on chopping (or fragmenting) (sub-)prefixes is arbitrary because it is fixed once and for all. To be more precise, each (sub-)prefix can be divided into only eight prefixes ($8=2^3$, because 51−48=54−51=3, for example); in other words, the length of a sub-prefix is systematically increased by three bits compared to the length of the (sub-)prefix from which it is obtained (for example, a /48 prefix is divided into eight /51 sub-prefixes).

Because of this static and arbitrary division, a router can assign network prefixes (by delegation) only to a fixed number of adjacent routers (eight routers), regardless of the total number of adjacent routers and regardless of the real number of interfaces that each of those adjacent routers includes (and thus regardless of the lengths of the prefixes they really require).

This lack of adaptability, which results from the fact that the routers do not know at least certain configuration characteristics of their adjacent routers, may prove particularly troublesome in certain situations.

An object of the invention is therefore to solve the problem caused by the arbitrary policy on dividing network prefixes into sub-prefixes, as much in hierarchical prefix delegation (HPD) networks as in dynamic host configuration protocol (DHCP) networks.

SUMMARY OF THE INVENTION

To this end it proposes a device dedicated to assigning prefixes for network equipments of an Internet Protocol network, comprising processing means which, if they receive a request to assign a prefix of length L(Rk) for a network equipment Rk, determine, for example in a binary tree type data structure, a node Nj associated with an unallocated prefix Pj of length L(Pj) equal to L(Rk)−m, m≧0, in order to assign that prefix to the network equipment Rk if the value of m is equal to 0 or, if the value of m is greater than 0, to perform successively m loops each consisting in fragmenting the current prefix P into two prefixes P1 and P2 with lengths equal to L(P)+1 and then select one of the two prefixes P1 and P2 as the current prefix for the next loop, until there are obtained in the last of the m loops two prefixes with lengths equal to L(Rk), followed by the selection of one of them for assignment to the network equipment Rk.

In the present context, the term "assignment" refers as much to direct prefix allocation as to prefix reservation leading to final allocation of the reserved prefix in the event of confirmation of reservation. Moreover, in the present context, the variable "m" designates the number of fragmentation loops to be effected, and therefore the number of divisions by two that must be applied to the current prefix P.

The device of the invention may have other features, and in particular, separately or in combination:

its processing means may determine the node Nj from a set of nodes Nj;

the set of nodes may comprise only nodes whose prefixes are unassigned, for example;

the processing means may determine the node Nj associated with the unassigned prefix Pj of length L(Pj) equal to L(Rk)−m for which the associated value of m is the smallest possible positive value or a null value; minimizing the value of m means fragmenting at least the initial total addressing space;

the processing means may instead determine the node Nj associated with the unassigned prefix Pj of length L(Pj) equal to L(Rk)−m that is the first node encountered associated with a positive or null value of m;

a memory in which the processing means can store data representing nodes of the set of nodes in corresponding relationship to time information representing their assignment date;

the memory may instead be an FIFO memory; in this case, the processing means can store data representing nodes of the set of nodes as a function of their assignment date, the oldest data being stored at the top of a stack of the memory;

the processing means may store in the memory data representing lengths and/or at least a portion of the prefixes associated with the nodes;

the processing means may concatenate a 0 bit to the right-hand end of the current prefix P to constitute the prefix P1 and concatenate a 1 bit to the right-hand end of the current prefix P to constitute the prefix P2;

the prefix part consists, for example, of the sequence of less significant bit values concatenated, during successive fragmentations, to the right-hand end of the shortest prefix associated with a root node;

its processing means may systematically first select always the same one of the two prefixes P1 and P2 (for example P2) and then select the other one (for example P1) if the first one is not available;

if the assignment requests take the form of requests for reservation of the prefix to be allocated, the processing means, after assigning a prefix, may trigger a time-delay of selected duration for allocating the assigned prefix in the event of reception of a reservation confirmation before the selected duration has elapsed;

for example, if no confirmation of reservation is received before the selected duration has elapsed, the processing means may eliminate from the memory at least the data representing the node whose prefix had been assigned with a view to reservation;

in the event of liberation of a father prefix following the elimination of data of a node whose prefix was one of the two prefixes resulting from fragmentation of the father prefix, the processing means may eliminate from the memory the data representing the node associated with the father prefix.

The invention also proposes a network equipment of the router type, for an address auto-configuration IP network, equipped with a management device of the type described above.

The invention further proposes a centralized server, for a dynamic host configuration protocol (DHCP) IP network, equipped with a management device of the type described above.

The invention is particularly well adapted, although not exclusively so, to IPv6 and Ipv4 networks.

Other features and advantages of the invention will become apparent on reading the following detailed description and examining the appended drawings.

DETAILED DESCRIPTION OF THE PREFERRED EMBODIMENT

The appended drawings constitute part of the description of the invention as well as contributing to the definition of the invention, if necessary.

An object of the invention is to enable dynamic and non-arbitrary assignment of prefixes as a function of the requirements of the network equipments of an IP network.

It is considered hereinafter, by way of nonlimiting example, that the network equipments are routers.

Broadly speaking, but nevertheless in sufficient detail for the invention to be understood, an IP network may be regarded as a network interconnecting groups of routers (R) able to communicate with each other via local links to which their communication interfaces Ii are connected once they have been configured accordingly.

In the present context, the expression "local link" refers to a communication channel, for example an Ethernet link, to which routers are connected through one of their communication interfaces (I).

It is considered hereinafter, by way of nonlimiting example, that the communication network is an IPv6 network. The invention is not limited to that type of network, however. It relates to all IP networks requiring dynamic assignment of variable length prefixes as a function of requirements, and in particular IPv4 networks.

Remember that in an IPv6 network an (IPv6) address comprises 128 bits, the leftmost 64 bits constituting the network identifier and the rightmost 64 bits constituting the interface identifier.

As indicated in the introduction, the interface identifiers are determined by each router, for its own interfaces I, by means of their MAC addresses. This makes it possible to differentiate the interfaces I of different routers connected to the same (local) link. Moreover, the network identifiers are constituted on the basis of a configuration global network prefix occupying the more significant 48 bits (denoted /48), for example. This global network prefix is supplied by a prefix server to one of the routers R called the "root router", for example. It defines a family of addresses for all the routers adjacent the root router and for all the other routers that in the final analysis belong to the same hierarchical delegation tree.

It is considered hereinafter, by way of nonlimiting example, that the IPv6 network is a stateless address auto-configuration network and therefore uses a hierarchical prefix delegation (HPD) protocol. However, the invention is not limited to this type of prefix assignment and this protocol. It relates equally to dynamic host configuration protocol (DHCP) networks.

Unlike a DHCP network, in which the prefixes are assigned to the various DHCP routers by a centralized server, in a stateless address auto-configuration (HPD) IPv6 network, the HPD routers of the network assign prefixes to each other, apart from the global prefix, which is generally supplied to the root router by a prefix server.

Figure 1:
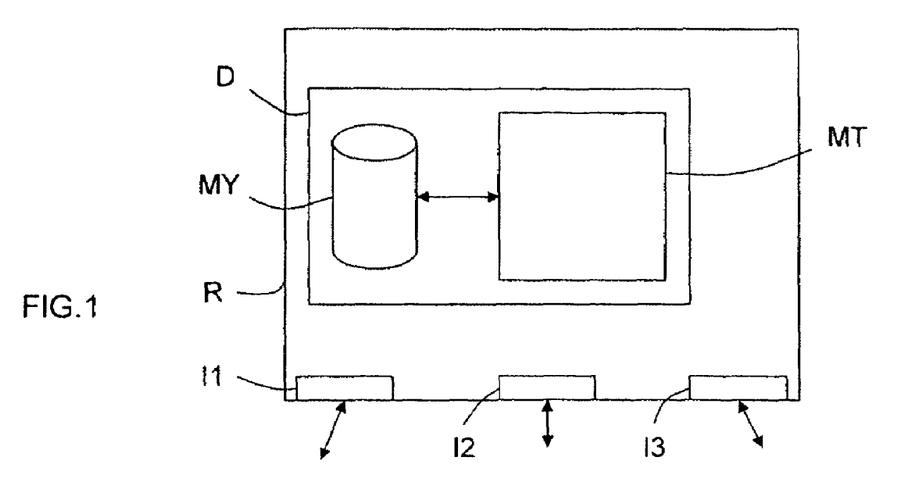
FIG. 1 is a functional diagram of a router equipped with one embodiment of a prefix assignment device of the invention.

To enable prefix auto-assignment, the invention proposes to equip certain at least of the routers R of a network, and preferably all of them, with a prefix assignment device D, for example of the type shown in FIG. 1.

In the example shown in FIG. 1, the device D of the invention is installed in the router R, but this is not obligatory. The device could take the form of a unit (or an electronic circuit card) adapted to be connected to a router.

It is important to note that in the case of a DHCP network, the device D may be installed in (or connected to) a centralized server responsible for assigning prefixes to the routers. A centralized server of this kind may itself form part of a router.

In the example shown in FIG. 1, the router R comprises, by way of purely illustrative example, three interfaces I1 to I3. It may include any number of interfaces Ii, however, provided that the value of i is greater than or equal to 1.

As shown diagrammatically in FIG. 1, a device D of the invention comprises at least one processing module MT for determining a prefix of length L(Rk) when it receives a prefix assignment request specifying said length L(Rk) from another router Rk, where applicable an adjacent router.

Remember that in an IPv6 stateless address auto-configuration (HPD) network the expression "prefix delegation router" (or, more simply, "delegated router") refers to a router that determines a prefix via another router which requests it and which is referred to as the "requesting router". Each router Ri of the network can act as a delegated router for assigning (fragmented or divided) (sub-)prefixes to certain routers Ri' and as a requesting router vis à vis a delegated router for having itself assigned a (fragmented or divided) (sub-)prefix, which it may where applicable divide afterwards for the requirements of other requesting routers.

Generally speaking (i.e. in an HPD (hierarchical) or DHCP (centralized) network), an "assignment request" may be either a request for direct allocation of a prefix (without reservation), or a prefix reservation request that leads in the end to definitive allocation of the reserved prefix only in the event of confirmation of the reservation.

On receiving a request for assignment of a prefix of length L(Rk), the processing module MT firstly determines a node Nj associated with an unassigned prefix Pj of length L(Pj) equal to L(Rk)−m, where m is a positive or null integer.

If the value of m is 0, there is an unassigned prefix Pj whose length L(Pj) is equal to the prefix length L(Rk) requested by the requesting router Rk. In this case, the processing module MT assigns (reserves or allocates) the prefix Pj (of the node Nj) to the requesting router Rk.

On the other hand, if the value of m is greater than 0, there is an unallocated prefix Pj whose length L(Pj) is equal to the prefix length L(Rk) plus m, requested by the requesting router Rk. In this case, the processing module MT executes m successive loops each consisting in fragmenting (or dividing or chopping) the current prefix P into two prefixes P1 and P2 with lengths L(P)+1, then selecting one of the two prefixes P1 and P2 (first one of them, for example P2 by convention, then P1 if P2 cannot be selected) as the current prefix for the next loop, until there are obtained on the last of the m loops two prefixes with lengths equal to L(R), followed by selecting one of them to assign to the router.

By definition, the current prefix P is that fragmented into two parts P1 and P2 in a given loop.

Figure 2:
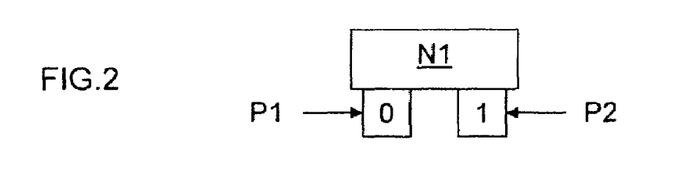
FIG. 2 is a diagram of the prefix fragmentation mechanism of the invention.

FIG. 2 is a diagram of the fragmentation mechanism. It consists, for example, in concatenating a 0 bit to the right-hand end of the current prefix P to constitute the prefix P1 and concatenating a 1 bit to the right-hand end of the current prefix P to constitute the prefix P2. In other words, a prefix P1 consists of the bits of the current prefix P and an additional 0 bit concatenated to the right-hand end of the latter and a prefix P2 consists of the bits of the current prefix P and an additional 1 bit concatenated to the right-hand end thereof.

Figure 3:
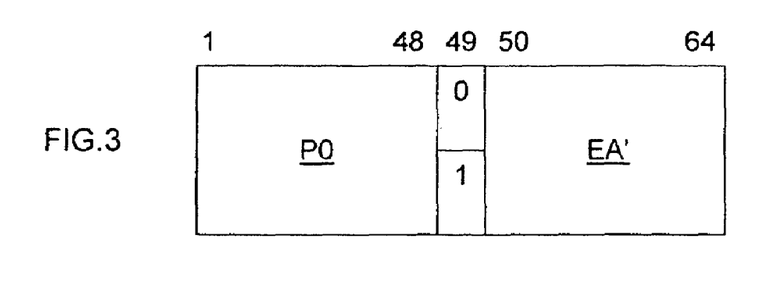
FIG. 3 is a diagram showing the impact of the prefix fragmentation mechanism shown in FIG. 2 on the global network prefix P0 and its initial addressing space EA.

For example, as shown in FIG. 3, if the current prefix P=P0 is of /48 type, which corresponds to a length L(P)=48 bits (bits 1 to 48) and an addressing space EA equal to 16 bits (bits 49 to 64), the two prefixes P1 and P2 that result from its fragmentation are of type /49, which corresponds to a length L(P)=49 bits (bits 1 to 49) and an addressing space EA' equal to 15 bits (bits 50 to 64).

In each loop, the processing module MT can systematically select the prefix P2 to use it in the next loop, if any, or to assign it to the requesting router Rk if its length is equal to L(Rk). Of course, the prefix P1 could equally well be selected systematically, or one of the two prefixes P1 and P2 selected in each loop in any other suitable manner.

The node Nj associated with an unallocated prefix Pj of length L(Pj) equal to L(Rk)−m may be selected in various ways.

A first way is to select as the node Nj the delegated router Rj that received the assignment request from a requesting router Rk. The prefix Pj that is associated with the node Nj is then the prefix that was previously assigned to the delegated router Rj, either by the prefix server if it is the root router or by another router. In this case, the value of m is strictly greater than 0, and the processing module MT executes one or more loops to determine the prefix of length L(Rk).

Figure 4:
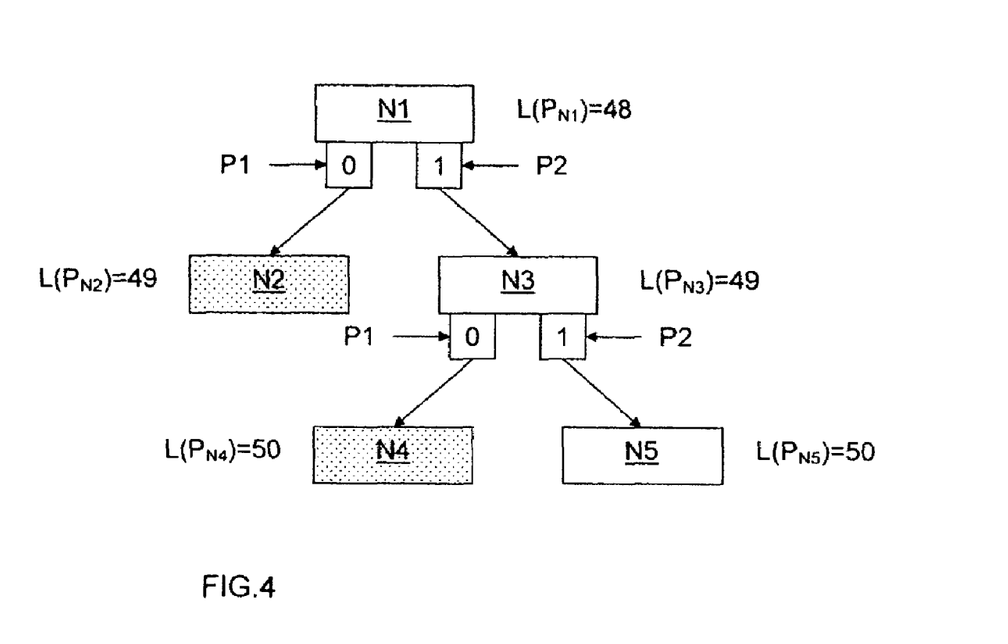
FIG. 4 is a diagram of a first example of a hierarchical delegation tree according to the invention, following two fragmentations in accordance with the invention.
Figure 5:
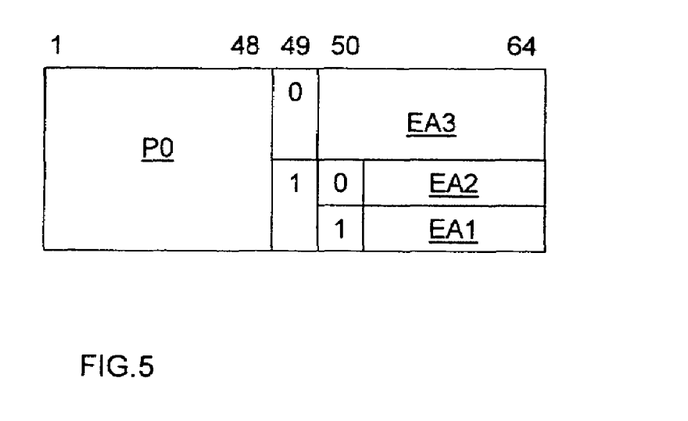
FIG. 5 is a diagram showing the impact of the double prefix fragmentation shown in FIG. 4 on the global network prefix P0 and its initial addressing space EA.

For example, as shown in FIGS. 4 and 5, the delegated router Rj may be the root router, which has a prefix Pj of length L(Pj) equal to 48, and the requesting router Rk may require a prefix Pk of length L(Pk) equal to 50.

In this situation m=2, so that the processing module MT has to execute two fragmentation loops to constitute a prefix Pk of length equal to 50 bits from the prefix Pj of length equal to 48 bits.

During the first fragmentation loop, the processing module MT fragments the current prefix P=Pj of the router Rj, which corresponds in the figure to the node N1, into two parts which then constitute the prefixes P1 (Pj+0) and P2 (Pj+1) with lengths equal to L(Pj)+1, that is 49 bits. These two prefixes P1 and P2, generated in the first loop, correspond to the nodes N2 and N3, respectively, having respective lengths $L(P_{N2})$ and $L(P_{N3})$ equal to 49 bits.

It is important to note that these prefixes P1 and P2 are unassigned (this is a result of the difference between a "division" at the level of a node (partially) internal to the tree and a "prefix" which always relates to a "leaf").

For example, the prefix P1 remains available, for future assignment, where applicable subject to fragmentation, whereas the prefix P2 is used as the current prefix P by the processing module MT during the second fragmentation loop.

During the second fragmentation loop, the processing module MT fragments the current prefix $P=P_{N3}$, associated with the node N3, into two parts which then constitute the prefixes P1($P_{N3}+0=Pj+1+0$) and P2 ($P_{N3}+1=Pj+1+1$) of lengths equal to $L(P_{N3})+1$, that is 50 bits. These two prefixes P1 and P2, generated in the second loop, correspond to the nodes N4 and N5, respectively, and have respective lengths $L(P_{N4})$ and $L(P_{N5})$ equal to 50 bits.

The prefixes P1 and P2 resulting from the second loop being of length equal to L(Rk), that is 50 bits, the processing module MT can therefore assign one of them to the requesting router Rk, the other remaining available, for future assignment, where applicable subject to fragmentation. For example, as shown in FIGS. 4 and 5, the processing module MT selects the node N5 in order to assign the associated prefix P2=$P_{N5}$ to the requesting router Rk, the prefix P1=$P_{N4}$ associated with the node N4 remaining available.

That prefix $P_{N5}$, equal to Pj+1+1, is then sent by the delegated router Rj to the requesting router Rk in the form of an HPD message in order for it to be able to configure its interfaces and determine in turn, where applicable, prefixes with lengths greater than its own (here $L(P_{N5})$=50 bits) and smaller addressing spaces for other requesting routers.

In the hierarchical tree shown in FIG. 4, the node N5 is shaded because it represents a router Rk which has been assigned the prefix $P_{N5}$=Pj+1+1, and the nodes N2 and N4 are spotted because their respective prefixes have not yet been assigned.

Moreover, as shown in FIG. 5, the addressing space EA1 corresponding to the assigned prefix $P_{N5}$ is equal to 14 bits, the addressing space EA2 corresponding to the unassigned prefix $P_{N4}$ is equal to 14 bits, and the addressing space EA3 corresponding to the unassigned prefix $P_{N2}$ is equal to 15 bits.

A second way is to select the node Nj from a set of nodes one of which corresponds to the delegated router Rj that received the assignment request from a requesting router Rk.

The set of nodes may constitute a hierarchical tree whose root node is associated with the root router or with the delegated router Rj. It may equally comprise only nodes whose prefixes have not yet been assigned, and for this reason are not yet associated with routers.

The data representing the nodes of the set may be stored in a memory MY. If the routers are of the HPD type and the root node of the set is the delegated router Rj in which the device D is installed, the memory MY is preferably part of said device D. However, it may be envisaged that the memory MY is installed in a centralized server or in the root router, in particular if the root node of the set is the root router or the network is of the DHCP type.

Of the data of the nodes Nm that is stored in the memory MY, there may be cited in particular the data representing the length $L(P_{Nm})$ of the associated prefix $P_{Nm}$.

That length data ($L(P_{Nm})$) may be stored in corresponding relationship to other data, for example the whole or a part of the associated prefix ($P_{Nm}$). If the prefix associated with the root node of a set is known, it is not necessary to store all of the prefixes resulting from fragmentation in accordance with the invention. To define a given node it suffices to store for that node the sequence of values of bits that were concatenated to the prefix of the root node in successive fragmentation loops. Storing only series of values of concatenated bits may even be envisaged, as they represent the lengths of the corresponding prefixes.

Storing time information data representing prefix assignment dates may also be envisaged. Instead of storing this kind of time information data, a first in first out (FIFO) memory MY may be used. In this case, the data (for example the prefix lengths and/or the sequences of concatenated bit values) that is the oldest is stored at the top of the stack in the FIFO memory and the first nodes that can be extracted from the FIFO memory are those whose data is stored at the top of the stack. This option is discussed further later.

The data is stored in the memory MY in the form of a binary tree data structure, for example. This is advantageous because the starting point is a single addressing space and divisions (or fragmentations) by two (2) are carried out hierarchically.

Regardless of the storage mode, the processing module MT determines from the set of nodes whose data is stored a node Nj that is associated with the unassigned prefix Pj whose length L(Pj) is equal to L(Rk)−m and for which the associated value of m is positive or null.

In a first embodiment, the processing module MT can select as the starting node Nj from the set of nodes the node whose value of m is positive or null and that it encounters first when it reads the content of the memory MY.

This solution is not the optimum in terms of the number of prefixes assigned, because it can lead to the fragmentation of short prefixes (which therefore have a large addressing space), when other, longer prefixes (having a smaller addressing space) and satisfying the same condition (m≧0) are available.

It is therefore preferable to envisage a second embodiment (improving on the first) in which the processing module MT selects as the starting node Nj, from all the nodes of the set whose data is stored in the memory MY, the node which corresponds to the value of m that is the smallest possible positive value or a null value.

In this case, the processing module MT first determines in the memory MY all of the nodes that correspond to a value of m greater than or equal to 0 by comparing their prefix length to the length L(Rk). It then determines from those nodes the one node (or the nodes) corresponding to the smallest possible value of m. If there is more than one candidate node, the processing module MT selects one of them, for example at random.

The unassigned prefix Pj that is associated with the selected node, here designated Nj, is then used by the processing module MT to determine the prefix P(Rk) of length L(Rk). As indicated above, if the length L(Pj) of the prefix P(j) associated with the selected node Nj is equal to L(Rk), the value of m is then equal to 0 and the processing module MT assigns the prefix Pj to the requesting router Rk. On the other hand, if the length L(Pj) of the prefix P(j) associated with the selected node Nj is equal to L(Rk)−m, then the processing module MT must perform m fragmentation loops using Pj as the current prefix P in the first loop.

Figure 6:
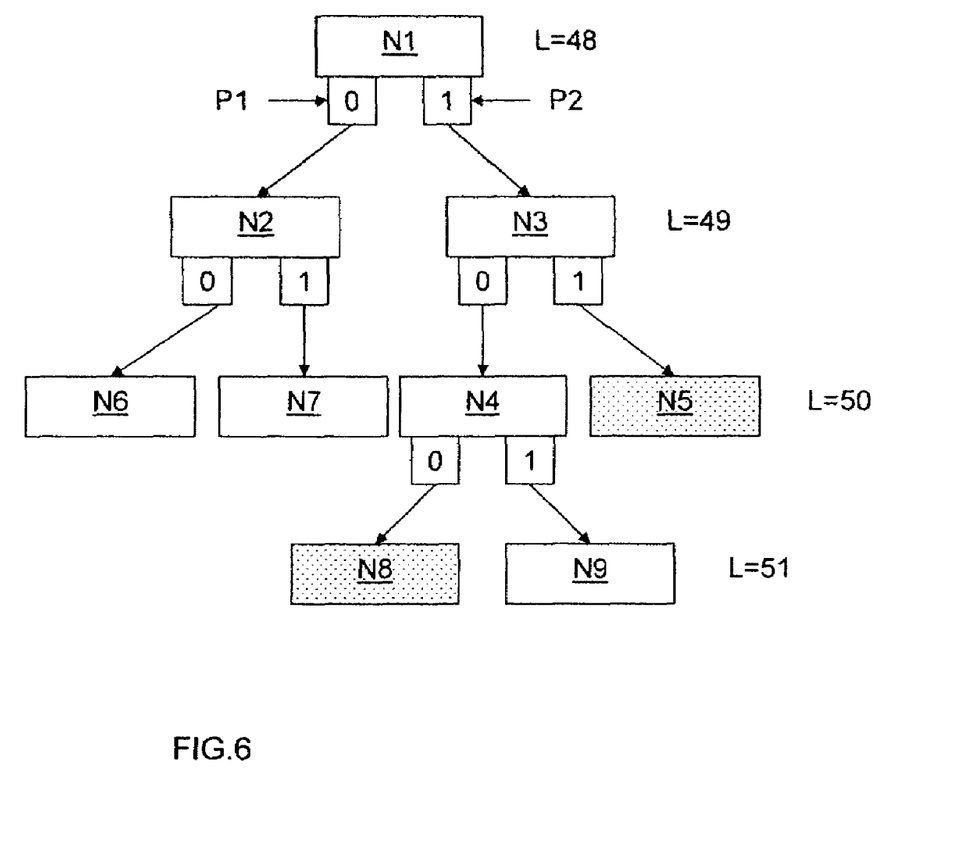
FIG. 6 is a diagram of a second example of a hierarchical delegation tree according to the invention, following four fragmentations in accordance with the invention.

An example of the use of the second embodiment is described next with reference to FIG. 6.

In this example, the hierarchical tree consists of nine nodes N1 to N9.

Here the root node N1 represents the root router Rj that is associated with the prefix Pj of length L(Pj)=$L(P_{N1})$=48 bits.

The nodes N2 and N3 result from a preceding fragmentation of the prefix N1 and are respectively associated with prefixes $P_{N2}$ and $P_{N3}$ of lengths $L(P_{N2})$=$L(P_{N3})$=49 bits.

The nodes N6 and N7 result from a preceding fragmentation of the prefix N2 and are respectively associated with prefixes $P_{N6}$ and $P_{N7}$ of length $L(P_{N6})$=$L(P_{N7})$=50 bits. Moreover, the nodes N6 and N7 are in gray because they both represent routers to which the prefixes $P_{N6}$=Pj+0+0 and $P_{N7}$=Pj+0+1 have been assigned.

The nodes N4 and N5 result from a preceding fragmentation of the prefix N3 and are respectively associated with prefixes $P_{N4}$ and $P_{N5}$ of lengths $L(P_{N4})=L(P_{N5})=50$ bits. The node N5 is dotted because its prefix has not yet been assigned.

The nodes N8 and N9 result from a preceding fragmentation of the prefix N4 and are respectively associated with prefixes $P_{N8}$ and $P_{N9}$ of lengths $L(P_{N8})=L(P_{N9})=51$ bits. The node N8 is dotted because its prefix has not yet been assigned. The node N9 is in gray because it represents a router that has been assigned the prefix $P_{N9}=Pj+1+0+1$.

In this example of a hierarchical tree resulting from at least four fragmentations, the set of nodes whose prefixes have not been assigned therefore consists of the nodes N5 and N8. Consequently, when the processing module MT of the delegated router Rj receives a prefix assignment request from a requesting router Rk, it accesses the memory MY to search the data for the nodes N5 and N8 for the data that corresponds to the condition as to the value of m.

For example, if the length L(Rk) required by the requesting router Rk is equal to 50 bits, because it is available, the processing module MT can immediately assign the requesting router Rk the prefix $P_{N5}$ associated with the node N5.

Now, if the length L(Rk) required by the requesting router Rk is equal to 52 bits, the processing module MT can take only the unassigned prefix $P_{N8}$ associated with the node N8 as the current prefix P for the single fragmentation loop to be performed (here $m=L(Rk)-L(P_{N8})=1$). It therefore fragments the current prefix $P_{N8}$ into two parts, which gives two prefixes P1 and P2 with lengths equal to 52 bits. It then selects one of the two prefixes P1 and P2 to assign it to the requesting router Rk, for example the prefix P2.

Once the processing module MT has assigned a prefix following one or more fragmentations, it preferably stores in the memory MY the data that is associated with the corresponding node together with any data that is associated with another node or with other nodes resulting from the fragmentations whose prefix(es) has not or have not been assigned.

When prefix allocation is effected by reservation and confirmation of reservation, it is preferable for the processing module MT to be able to use a time-delay of selected duration for making available each reserved prefix for which no reservation confirmation has been received.

In this case, when the processing module MT assigns (i.e. reserves) a prefix, it triggers the time-delay immediately. If it receives a reservation confirmation message from the requesting router Rk before the time-delay expires, it allocates it the reserved prefix. If not, the prefix is available again. It is then preferable for the processing module MT to eliminate from the memory MY not only the data of the node whose prefix has been released, but also the data of all the nodes that were associated with "father" prefixes (relative to the released node) and that are associated with unassigned prefixes.

In the present context the term "father node" refers to a node whose father prefix has been fragmented into two prefixes P1 and P2. In FIG. 6, for example, the node N4 is a father node relative to the nodes N8 and N9. Accordingly, if the prefix $P_{N9}$ associated with the node N9 is released, then the two prefixes $P_{N8}$ and $P_{N9}$ resulting from the fragmentation of the prefix $P_{N4}$ are both unassigned, so that there is no call for fragmentation of the node N4. The prefix $P_{N5}$ associated with the node N5 being unassigned, the two prefixes $P_{N4}$ and $P_{N5}$ resulting from the fragmentation of the prefix $P_{N4}$ are both unassigned, so that there is no call to fragment the node N3. The hierarchical tree then comprises the nodes N1, N2, N3, N6 and N7, of which only the node N3 is associated with a short (49-bit) unassigned prefix and therefore with a large addressing space.

The processing module MT therefore eliminates from the memory MY the data representing the nodes N5 and N8 and stores in its place data representing the node N3.

To make it easier for the processing module MT to search a hierarchical tree for nodes whose prefixes have not been confirmed during the time-delay, it is possible, as indicated above, to store their data in corresponding relationship to time information data representing their respective assignment (reservation) dates. It is equally possible to use an FIFO memory in which the oldest data is stored at the top of the stack. Thus the nodes that can be extracted from the FIFO memory are those whose data is stored at the top of the stack, which avoids having to analyze the whole of the memory MY.

Similar management of the memory MY may be envisaged to take account of routers withdrawn from the network and associated with nodes of a hierarchical tree.

The prefix assignment device D of the invention, and in particular its processing module MT and its memory MY, where applicable, may take the form of electronic circuits or a combination of circuits and software.

The invention is not limited to the prefix assignment device, network equipment (e.g. router) and server embodiments described hereinabove by way of example only, and encompasses all variants that the person skilled in the art might envisage that fall within the scope of the following claims.

The invention claimed is:

1. A prefix assignment device for network equipments of an Internet Protocol communication network, the device comprising:
   a processing module
   (i) determining a node Nj associated with an unassigned prefix Pj of length L(Pj) equal to L(Rk)−m, such that $m \geq 0$ when the module receives a request to assign a prefix of length L(Rk) for a network equipment Rk,
   (ii) assigning the prefix Pj to the network equipment Rk if m is equal to 0,
   (iii) performing successive m loops if m is greater than 0, each of the successive m loops fragmenting a current prefix P into two prefixes P1 and P2 with lengths equal to L(P)+1 in an initial loop and then selecting one of the two prefixes P1 and P2 as the current prefix for a next loop until there are two prefixes with lengths equal to L(Rk) in the last of the m loops, and
   (iv) selecting one of the two prefixes with lengths equal to L(Rk) for assignment to the network equipment Rk.

2. The device according to claim 1, wherein the processing module determines the node Nj from a set of nodes.

3. The device according to claim 2, wherein the set of nodes includes nodes with unassigned prefixes.

4. The device according to claim 3, wherein in the processing module, m is a smallest possible positive value or a null value.

5. The device according to claim 3, wherein the processing module determines the node Nj that is a first node encountered and associated with a positive or null value of m.

6. The device according to claim 1, further comprising:
   a memory in which the processing module stores data representing nodes of a set of nodes corresponding to time information, the time information representing an assignment date.

7. The device according to claim 2, further comprising:
   a memory in which the processing module stores data representing nodes of a set of nodes corresponding to time information, the time information representing an assignment date.

8. The device according to claim 3, further comprising:
a memory in which the processing module stores data representing nodes of a set of nodes corresponding to time information, the time information representing an assignment date.

9. The device according to claim 4, further comprising:
a memory in which the processing module stores data representing nodes of a set of nodes corresponding to time information, the time information representing an assignment date.

10. The device according to claim 5, further comprising:
a memory in which the processing module stores data representing nodes of a set of nodes corresponding to time information, the time information representing an assignment date.

11. The device according to claim 1, further comprising:
a FIFO memory in which the processing module stores data representing nodes of a set of nodes as a function of an assignment date.

12. The device according to claim 6, wherein the processing module stores data in the memory, the data representing at least one of lengths and a portion of prefixes associated with the nodes.

13. The device according to claim 11, wherein the processing module stores data in the memory, the data representing at least one of lengths and a portion of prefixes associated with the nodes.

14. The device according to claim 6, wherein the data is stored in the memory in the form of a binary tree data structure.

15. The device according to claim 11 wherein the data is stored in the memory in the form of a binary tree data structure.

16. The device according to claim 12, wherein the data is stored in the memory in the form of a binary tree data structure.

17. The device according to claim 1, wherein the processing module provides the prefix P1 by concatenating a 0 bit to an end of the current prefix P and provides the prefix P2 by concatenating 1 bit to the end of the current prefix P.

18. The device according to claim 12, wherein the portion of the prefixes includes a sequence of less significant bit values concatenated, during successive fragmentations, to an end of a shortest prefix associated with a root node.

19. The device according to claim 17, wherein the portion of the prefixes includes a sequence of less significant bit values concatenated, during successive fragmentations, to an end of a shortest prefix associated with a root node.

20. The device according to claim 1, wherein the processing module selects at least one of prefixes P1 and P2 and selects an unselected prefix when the at least one of prefixes P1 and P2 is not available.

21. The device according to claim 1, wherein the request to assign is a prefix allocation requests.

22. The device according to claim 1, wherein the request to assign is a requests for reservation of a prefix to be allocated.

23. The device according to claim 22, wherein after assigning a prefix the processing module triggers a time-delay for allocating the assigned prefix when receiving a reservation confirmation before a selected duration elapses.

24. The device according to claim 6, wherein
after assigning a prefix the processing module triggers a time-delay for allocating the assigned prefix a reservation confirmation is received before a selected duration elapses,
such that, if no confirmation of reservation is received before the selected duration elapses, the processing module eliminates from the memory at least the data representing the node corresponding to an assigned prefix and reservation.

25. The device according to claim 11 wherein
after assigning a prefix the processing module triggers a time-delay for allocating the assigned prefix if a reservation confirmation is received before a selected duration elapses,
such that, if no confirmation of reservation is received before the selected duration elapses, the processing module eliminates from the memory at least the data representing the node corresponding to an assigned prefix and reservation.

26. The device according to claim 12, wherein
after assigning a prefix the processing module triggers a time-delay for allocating the assigned prefix if a reservation confirmation is received before a selected duration elapses,
such that, if no confirmation of reservation is received before the selected duration elapses, the processing module eliminates from the memory at least the data representing the node corresponding to an assigned prefix and reservation.

27. The device according to claim 14, wherein
after assigning a prefix the processing module triggers a time-delay for allocating the assigned prefix if a reservation confirmation is received before a selected duration elapses,
such that, if no confirmation of reservation is received before the selected duration elapses, the processing module eliminates from the memory at least the data representing the node corresponding to an assigned prefix and reservation.

28. The device according to claim 24 wherein, the processing module eliminates the data from the memory when a father prefix is freed following data elimination at a node whose prefix was one of the two prefixes resulting from fragmentation of the father prefix.

29. A network equipment for an address auto-configuration Internet Protocol communication network, comprising a prefix assignment device according to claim 1.

30. A network equipment according to claim 29, taking the form of a router.

31. A server for a dynamic host configuration Internet Protocol communication network, comprising a prefix assignment device according to claim 1.

32. A server for a dynamic host configuration Internet Protocol communication network, comprising a prefix assignment device according to claim 28.

* * * * *

UNITED STATES PATENT AND TRADEMARK OFFICE
CERTIFICATE OF CORRECTION

| | | |
|---|---|---|
| PATENT NO. | : 7,577,138 B2 | Page 1 of 1 |
| APPLICATION NO. | : 11/305042 | |
| DATED | : August 18, 2009 | |
| INVENTOR(S) | : Bras et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Seventh Day of September, 2010

David J. Kappos
*Director of the United States Patent and Trademark Office*